United States Patent [19]
Miller et al.

[11] Patent Number: 5,492,558
[45] Date of Patent: Feb. 20, 1996

[54] COLOR CHANGING COMPOSITIONS FOR HIGHLIGHTERS

[75] Inventors: Richard E. Miller, Nazareth; Cheryl Krieger, Bangor, both of Pa.

[73] Assignee: Binney & Smith Inc., Easton, Pa.

[21] Appl. No.: 317,139

[22] Filed: Oct. 3, 1994

Related U.S. Application Data

[63] Continuation-in-part of Ser. No. 270,454, Jul. 5, 1994, Ser. No. 270,485, Jul. 5, 1994, Ser. No. 270,940, Jul. 5, 1994, Ser. No. 270,998, Jul. 5, 1994, and Ser. No. 78,722, Jun. 16, 1993, Pat. No. 5,352,282, which is a continuation of Ser. No. 923,308, Jul. 31, 1992, Pat. No. 5,232,494, said Ser. No. 270,454, Ser. No. 270,485, Ser. No. 270,940, and Ser. No. 270,998, which is a continuation-in-part of Ser. No. 89,503, Jul. 16, 1993, Pat. No. 5,326,388, which is a continuation-in-part of Ser. No. 923,308.

[51] Int. Cl.⁶ .................................................. C09D 11/02
[52] U.S. Cl. ..................... 106/22 B; 106/21 A; 106/21 R
[58] Field of Search ........................... 106/21 A, 22 B, 106/21 R

[56] References Cited

U.S. PATENT DOCUMENTS

| | | | |
|---|---|---|---|
| 1,550,048 | 8/1925 | Ruben | 401/194 |
| 2,086,745 | 7/1937 | Sell | 106/22 B |
| 2,305,098 | 12/1942 | Minnear | 106/23 B |
| 2,453,201 | 11/1948 | Cushman | 401/207 |
| 2,555,474 | 6/1951 | deVries | 106/22 H |
| 2,559,608 | 10/1951 | Ehrlich | 106/22 A |
| 2,589,306 | 3/1952 | Steiner | 106/22 A |
| 3,221,361 | 12/1965 | Cline | 401/198 |
| 3,400,003 | 9/1968 | Guertin | 106/22 R |
| 3,617,325 | 11/1971 | Spokes et al. | 427/145 |
| 3,627,546 | 12/1971 | Coppeta | 106/21 A |
| 3,672,842 | 6/1972 | Florin | 106/21 A |
| 3,700,603 | 10/1972 | Rembaum | 106/21 A |
| 3,705,045 | 12/1972 | Nadolski | 106/22 D |
| 3,870,435 | 3/1975 | Watanabe et al. | 427/145 |
| 3,873,185 | 3/1975 | Rogers | 430/4 |
| 3,876,496 | 4/1975 | Lozano | 106/21 A |
| 3,886,083 | 5/1975 | Laxer | 106/21 A |
| 3,941,488 | 3/1976 | Maxwell | 401/17 |
| 3,945,836 | 3/1976 | Miyata | 106/22 R |
| 3,945,837 | 3/1976 | Miyata et al. | 106/22 D |
| 3,952,314 | 4/1976 | Maltz | 401/194 |
| 3,957,495 | 5/1976 | Teranishi et al. | 106/19 E |
| 3,966,400 | 6/1976 | Birke et al. | 8/478 |
| 3,979,550 | 9/1976 | Panken | 106/21 R |
| 3,982,251 | 9/1976 | Hochberg | 106/21 A |
| 3,990,839 | 11/1976 | von der Eltz et al. | 8/14 |
| 4,028,118 | 6/1977 | Nakasuji et al. | 106/21 E |
| 4,070,194 | 1/1978 | Arakawa | 106/21 R |
| 4,071,645 | 1/1978 | Kahn | 106/6 |
| 4,098,738 | 7/1978 | Buerkley et al. | 106/21 R |
| 4,139,965 | 2/1979 | Curry et al. | 427/333 |
| 4,162,164 | 7/1979 | Lin | 106/21 R |
| 4,171,982 | 10/1979 | Lin | 106/21 A |
| 4,176,361 | 11/1979 | Kawada et al. | 106/20 R |
| 4,193,906 | 3/1980 | Hatanaka | 106/23 B |

(List continued on next page.)

FOREIGN PATENT DOCUMENTS

| | | |
|---|---|---|
| 282178 | 2/1988 | European Pat. Off. . |
| 289141 | 3/1988 | European Pat. Off. . |
| 352796 | 7/1989 | European Pat. Off. . |
| 506452 | 3/1992 | European Pat. Off. . |
| 506452 | 3/1992 | European Pat. Off. . |
| 2487372 | 3/1981 | France . |
| 551775 | 5/1927 | Germany . |
| 2724820 | 6/1977 | Germany . |
| 2834459 | 8/1978 | Germany . |
| 2927006 | 7/1979 | Germany . |
| 2927005 | 7/1979 | Germany . |
| 3207217 | 2/1982 | Germany . |
| 59-86672 | 5/1984 | Japan . |
| 59-179572 | 10/1984 | Japan . |
| 62-28834 | 7/1987 | Japan . |
| 1-103676 | 4/1989 | Japan . |
| 3-243673 | 10/1991 | Japan . |
| 1455678 | 1/1975 | United Kingdom . |

OTHER PUBLICATIONS

Brochure from "Unity Co", 1990 (no month available).
Photocopy of the Packaging Material Binney & Smith, Inc., Easton, PA. (1992).
"Hydrogen–Ion Activity to Laminated Materials, Glass", *Kirk–Othmer Encyclopedia of Chemical Technology*, 13 pp. 374–398, 1981 (no month available).
"Color Fibre Pen Inks", BASF Brochure, (1979).
Miscellaneous Popping Marker Documents (no date available).
Miscellaneous Popping Marker Documents, Feb. 1994 and Jun. 1991.

*Primary Examiner*—Helene Klemanski
*Attorney, Agent, or Firm*—Leydig, Voit & Mayer, Ltd.

[57] ABSTRACT

A multiple coloring composition system is disclosed wherein the coloring effect of a first undercolor coloring composition is changed upon treatment with a second coloring composition, once the second coloring composition has been deposited over the undercolor coloring composition. The multiple coloring composition system comprises:

(a) an aqueous undercolor coloring composition comprising an undercolor dye whose coloring ability is destroyed in the presence of a pH of about 10 or greater and/or a reducing agent, and a compatible surfactant in an amount sufficient to increase the stability of said coloring composition; and (b) an aqueous overcolor coloring composition comprising an overcolor dye capable of maintaining its characteristic color in the presence of a pH of about 10 or greater and/or a reducing agent, an effective amount of a base sufficient to yield a pH of the aqueous overcolor coloring composition of about 10 or greater and/or a reducing agent, and a compatible surfactant in an amount sufficient to increase the capillary flow of said aqueous overcolor coloring composition.

The multiple coloring composition system is especially useful for highlighting text inasmuch as the coloring compositions preferably leave the highlighted indicia easily visible.

28 Claims, No Drawings

U.S. PATENT DOCUMENTS

| | | | |
|---|---|---|---|
| 4,212,676 | 7/1980 | Ueda | 106/19 B |
| 4,213,717 | 7/1980 | Lin | 106/22 B |
| 4,227,930 | 10/1980 | Lin | 106/22 B |
| 4,246,033 | 1/1981 | von Wartburg | 106/23 B |
| 4,252,845 | 2/1981 | Griffiths et al. | 106/21 A |
| 4,256,494 | 3/1981 | Yamamoto et al. | 106/22 A |
| 4,262,935 | 4/1981 | Anderson et al. | 503/208 |
| 4,322,466 | 3/1982 | Tomlinson | 106/21 R |
| 4,352,691 | 10/1982 | Owatari et al. | 106/22 R |
| 4,381,946 | 5/1983 | Uehara et al. | 106/22 K |
| 4,413,266 | 11/1983 | Aviram et al. | 106/22 B |
| 4,428,994 | 1/1984 | Rawlins | 427/260 |
| 4,460,727 | 7/1984 | Shoji | 106/23 R |
| 4,490,177 | 12/1984 | Shioi et al. | 106/22 R |
| 4,505,749 | 3/1985 | Kanekiyo et al. | 106/22 R |
| 4,525,214 | 6/1985 | Panken | 106/19 B |
| 4,525,215 | 6/1985 | Shioi et al. | 106/22 R |
| 4,525,216 | 6/1985 | Nakanishi | 106/23 B |
| 4,557,618 | 12/1985 | Iwata et al. | 106/20 R |
| 4,578,117 | 3/1986 | Nakanishi | 106/20 A |
| 4,604,139 | 8/1986 | Shioi et al. | 106/23 C |
| 4,620,941 | 11/1986 | Yoshikawa et al. | 252/408.1 |
| 4,681,471 | 7/1987 | Hayduchok et al. | 106/22 B |
| 4,708,817 | 11/1987 | Dudnick | 106/22 B |
| 4,725,316 | 2/1988 | Mahany, II | 106/499 |
| 4,732,614 | 3/1988 | Brooks et al. | 106/23 B |
| 4,744,826 | 5/1988 | Iijima | 106/20 A |
| 4,746,936 | 5/1988 | Takahashi | 401/195 |
| 4,778,525 | 10/1988 | Kobayashi et al. | 106/22 B |
| 4,889,559 | 12/1989 | Goldberg et al. | 106/21 C |
| 4,907,903 | 3/1990 | Kawashima | 106/21 R |
| 4,942,185 | 7/1990 | Inoue et al. | 521/54 |
| 4,954,174 | 9/1990 | Imagawa | 106/27 R |
| 4,954,544 | 9/1990 | Chandaria | 524/111 |
| 4,973,499 | 11/1990 | Iwata et al. | 106/22 R |
| 4,988,123 | 1/1991 | Lin et al. | 106/23 R |
| 5,004,763 | 4/1991 | Imagawa | 523/161 |
| 5,006,171 | 4/1991 | Mecke et al. | 106/20 A |
| 5,009,536 | 4/1991 | Inoue et al. | 106/20 C |
| 5,017,226 | 5/1991 | Kulisz | 106/21 C |
| 5,024,699 | 6/1991 | Llyama et al. | 106/21 B |
| 5,043,013 | 8/1991 | Kluger et al. | 106/20 R |
| 5,082,386 | 1/1992 | Hironaka et al. | 401/206 |
| 5,106,881 | 4/1992 | Inoue et al. | 521/54 |
| 5,118,350 | 6/1992 | Prasad | 106/22 R |
| 5,120,359 | 6/1992 | Uzukawa et al. | 106/20 A |
| 5,139,572 | 8/1992 | Kawashima | 106/21 R |
| 5,176,746 | 1/1993 | Nakanishi et al. | 106/25 R |
| 5,196,237 | 3/1993 | May | 106/19 B |
| 5,196,243 | 3/1993 | Kawashima | 106/21 R |
| 5,203,913 | 4/1993 | Yamamoto et al. | 106/22 B |
| 5,215,956 | 6/1993 | Kawashima | 106/21 R |
| 5,222,823 | 6/1993 | Conforti | 106/22 B |
| 5,232,494 | 8/1993 | Miller | 106/22 B |
| 5,262,535 | 11/1993 | Kaiser | 106/22 B |
| 5,279,859 | 1/1994 | May | 106/19 B |
| 5,302,194 | 4/1994 | Tanabe et al. | 106/21 A |
| 5,320,668 | 6/1994 | Shields et al. | 106/20 R |
| 5,324,348 | 6/1994 | Perret, Jr. | 106/19 B |
| 5,326,388 | 7/1994 | Miller et al. | 106/22 B |
| 5,352,282 | 10/1994 | Miller | 106/22 B |

COLOR CHANGING COMPOSITIONS FOR HIGHLIGHTERS

RELATED APPLICATIONS

This application is a continuation-in-part of copending U.S. patent application Ser. No. 08/078,722, filed Jun. 16, 1993 which will issue as U.S. Pat. No. 5,352,282 on Oct. 4, 1994, which application was a continuation of previous U.S. patent application Ser. No. 07/923,308, filed Jul. 31, 1992 which issued as U.S. Pat. No. 5,232,494 on Aug. 3, 1993. This application also is a continuation-in-part of copending U.S. patent applications Ser. No. 08/270,454, 08/270,485, 08/270,940, and 08/270,998, all filed Jul. 5, 1994, and all which were continuation-in-part applications of U.S. patent application Ser. No. 08/089,503, filed Jul. 16, 1993, which issued as U.S. Pat. No. 5,326,388 on Jul. 5, 1994 and which was a continuation-in-part of U.S. patent application Ser. No. 07/923,308 which issued as U.S. Pat. No. 5,232,494 on Aug. 3, 1993.

FIELD OF THE INVENTION

This invention relates generally to the field of coloring compositions and more particularly to a pair of coloring compositions which are especially useful for highlighting and may be used in conjunction with each other to enable laying down an initial mark using a first coloring composition yielding a first color and then using an overcolor coloring composition to enable a change of color of a portion or the entirety of the initial mark while still enabling the text or other indicia marked over to be easily perceived and read where appropriate.

BACKGROUND OF THE INVENTION

Children enjoy various drawing and coloring activities using a variety of mediums. Useful in such activities are markers containing inks, crayons and pencils of various colors. However, children would often like to change the color of a mark after they have made the mark. One instance would be the desire to add yellow daisies in a previously colored field of grass and pink flowers. Other consumers including students and various types of workers also require differential marking capability as, for instance, those who routinely highlight clauses of written material of particular relevance. These consumers, as do the children, may change their mind after making a mark, and desire to change the color to set apart certain material.

Changing the color of a mark is not readily done with the typical coloring instruments previously used by consumers, such as those instruments described. In the past, marks were changed by placing the mark of one color over the mark of another color. When performing this using traditional marking pens, the marks produced are often not the desired colors and the tips of the markers get soiled with the other inks, rendering the marker useless. Also, with traditional highlighter inks, the colors tend to bleed together, resulting in undesirable color smears and combinations. Furthermore, oftentimes the use of a second color over the first renders the text illegible.

Therefore, there has been a long felt need for coloring compositions, for use as inks for highlighting, and markers containing such compositions, which produce marks of a first color that can be readily changed into a wide variety of second colors while leaving the highlighted indicia easily visible (i.e., have "read-through" capability). Especially needed is such a group of compositions which may be used in markers without soiling the nib of the second used marking instrument. Optimally, such compositions can be used on different types of paper without fading. In general, coloring compositions are mixtures of a coloring matter dispersed or dissolved in a carrier fluid. If the coloring matter is readily soluble in the carrier fluid it is termed a dye.

In one available marker application, a consumer is able to change a specific initial mark laid down to a second specific color by applying a reducing agent to the first mark yielding a change in color. The marker inks used in these markers are typically prepared by blending a reducing agent (sometimes termed a bleaching agent) or pH-sensitive dye with a dye that is stable in the presence of reducing agent or high pH. For example, German Patent Specification No. 2724820, (hereinafter "the German Patent"), concerns the combining of a chemically stable dye and a chemically unstable dye in an ink formulation. Once a mark using this combination of stable and unstable dyes is laid down, the mark may be overwritten with a clear reducing agent solution, eliminating the color contribution of the unstable dye. The resulting mark of the stable dye, with its characteristic color, remains.

There are several drawbacks to such a marking system. First, there are strict limitations on the number of color changes which may be produced. Specifically, in formulations made according to the German Patent, the particular ink composition may only be changed from a first color to a fixed second color. For example, a green mark may only be changed to a violet color as the inks are described in the practice of the German Patent. In addition, since one of the required pair of markers contains only the reducing agent, that reducing agent marker cannot render a visible mark and may only be used in combination with the base color marker. Once the base color marker is used up, the reducing agent marker is of no use. Or, once the reducing agent marker is used up, the base color marker may only be used for the color which it initially marks with. A further disadvantage of the marking process of the German Patent is that the nib of the reducing agent marker tends to get soiled by picking up the colors of the stable dye in the base coloring composition, thus tainting the color of subsequent marks.

The coloring composition may also optionally include such ingredients as humectants, preservatives, and drying agents. Humectants function to improve freeze/thaw stability and to control drying out of the tip when the coloring composition is used as a marker ink. Preservatives serve the obvious function of preventing spoilage of the coloring composition during the expected shelf life of the product derived therefrom (e.g., marker, ink or dye). Drying agents speed drying of a mark laid down by a marker.

Therefore, an object of the present invention is to provide a coloring composition system which is capable of enhanced multiple color changing abilities, and is especially suitable for highlighting.

An additional object of the present invention is to produce a coloring composition system for use in highlighting which includes at least two different coloring compositions each of which may be used independently or which may be used in combination to provide color changing ability, and each of which preferably leave the highlighted indicia easily visible, either when used alone, or in combination.

A further object of the present invention is to provide a coloring composition system in the form of inks which prevent a nib of a color changing marker from becoming visibly soiled from contacting a base color composition.

These and other objects will become apparent to those skilled in the art to which the invention pertains.

SUMMARY OF THE INVENTION

The present invention overcomes the drawbacks associated with prior overwriting ink compositions in that a particular undercolor coloring composition made according to the invention may be changed to a different second color, and perhaps even multiple second colors, depending upon the dye present in the overcolor coloring composition.

An advantage of an undercolor coloring composition of the present invention are that it produces marks of a first color that can be used on different types of paper (e.g., copy paper) without fading, and while leaving the highlighted indicia easily visible.

Advantageously, the overcolor coloring compositions of the present invention make a visible mark, thus they may be used alone or in combination with undercolor coloring compositions. This differential marking capacity is of particular benefit in highlighting applications.

An additional advantage of the overcolor compositions of the present invention is that, unlike currently used color change markers and highlighters, the nib of the tip of the marker containing a particular overcolor coloring composition does not become visibly soiled with the undercolor coloring composition color because the undercolor is immediately destroyed upon contact with the overcolor composition.

In general, the present invention is a multiple coloring composition system wherein the coloring effect of an undercolor coloring composition may be changed upon treatment with an overcolor coloring composition, once the overcolor coloring composition has been deposited over the undercolor coloring composition. In one embodiment, the multiple coloring composition system comprises:

(a) an aqueous undercolor coloring composition comprising an undercolor dye whose coloring ability is destroyed in the presence of a reducing agent and/or a pH of about 10 or greater, and a compatible surfactant in an amount sufficient to increase the stability of the coloring composition; and (b) an aqueous overcolor coloring composition comprising an overcolor dye capable of maintaining its characteristic color in the presence of a reducing agent, in the presence of a pH of about 10 or greater, or a combination thereof; a reducing agent and/or an effective amount of a base sufficient to yield a pH of the aqueous overcolor coloring composition of about 10 or greater; and a compatible surfactant in an amount sufficient to increase the capillary flow of the aqueous overcolor coloring composition.

Also disclosed is a multiple coloring composition system comprising:

(a) an aqueous undercolor coloring composition comprising an undercolor dye whose coloring ability is destroyed in the presence of a reducing agent and/or a pH of about 10 or greater, and a compatible surfactant in an amount sufficient to increase the stability of the coloring composition; and (b) an aqueous overcolor coloring composition comprising an overcolor dye capable of maintaining its characteristic color in the presence of a reducing agent and/or a pH of about 10 or greater, from about 1% to about 20% by weight of a reducing agent, an effective amount of a base sufficient to yield a pH of the aqueous overcolor coloring composition of about 10 or greater, and a compatible surfactant in an amount sufficient to increase the capillary flow of the aqueous overcolor coloring composition.

A color changing marking system is also disclosed which comprises at least two marking instruments, an undercolor marking instrument and an overcolor marking instrument. The undercolor marking instrument contains an undercolor coloring composition comprising: (a) an effective amount of an acid sufficient to maintain the pH of the undercolor coloring composition at from about 3 to about 6; (b) from about 0.05% to about 15% by weight of an undercolor dye; and (c) from about 20% to about 60% by weight of a surfactant. The overcolor marking instrument contains an overcolor coloring composition comprising: (a) from about 0.1% to about 12% by weight of a base; (b) from about 1% to about 20% by weight of a reducing agent; (c) from about 0.05% to about 15% by weight of an overcolor dye which maintains its characteristic color in the presence of a reducing agent and base in an amount from about 10% to about 12% by weight; and from about 0.5% to about 20% by weight of a surfactant.

The coloring compositions of the present invention may also optionally comprise a humectant, a drying agent, and a preservative.

DETAILED DESCRIPTION OF THE INVENTION

The present invention imparts the desirable ease of application and convenience of use of traditional color changer systems while avoiding the strict limitations of current color change markers. The composition of the present invention therefore imparts improved and convenient coloring properties.

In general, the present invention is a multiple coloring composition system wherein the color of a mark laid down by an undercolor coloring composition, for example using a marker to dispense the composition, may be overwritten by a variety of second colors upon the application of an overcolor coloring composition over the undercolor coloring composition. These coloring compositions are especially useful for highlighting indicia on substrates such as paper. Moreover, these coloring compositions are particularly advantageous in that the undercolor and overcolor coloring compositions each have "read-through" capability, or, leave the highlighted indicia easily legible, either when used alone, or when used in combination. Optimally, the read-through capability of the undercolor and overcolor coloring compositions should be such that xeroxed copies made of the highlighted material should also preferably leave the highlighted indicia easily visible. An embodiment of this marking system comprises:

(a) an aqueous undercolor coloring composition comprising an undercolor dye whose coloring ability is destroyed in the presence of a reducing agent and/or a pH of about 10 or greater, and a compatible surfactant in an amount sufficient to increase the stability of the coloring composition; and (b) an aqueous overcolor coloring composition comprising an overcolor dye capable of maintaining its characteristic color in the presence of a reducing agent and/or a pH of about 10 or greater, a reducing agent and/or an effective amount of a base sufficient to yield a pH of the aqueous overcolor coloring composition of about 10 or greater, and a compatible surfactant in an amount sufficient to increase the capillary flow of the aqueous overcolor coloring composition.

To increase the pH of the aqueous overcolor coloring composition, a base in an amount sufficient to elevate the pH of the aqueous coloring composition to a level of about 10 or greater, and preferably from about 10 to about 12, is preferably used.

In a preferred embodiment, the aqueous overcolor coloring composition comprises both a reducing agent and a base in an amount sufficient to elevate the pH of the aqueous overcolor coloring composition to about 10 or greater, and preferably from about 10 to about 12. In this preferred embodiment, the marking system comprises:

(a) an aqueous undercolor coloring composition comprising an undercolor dye whose coloring ability is destroyed in the presence of a reducing agent and/or a pH of about 10 or greater, and a compatible surfactant in an amount sufficient to increase the stability of the coloring composition; and (b) an aqueous overcolor coloring composition comprising an overcolor dye capable of maintaining its characteristic color in the presence of a reducing agent and/or a pH of about 10 or greater, from about 1% to about 20% by weight of a reducing agent, an effective amount of a base sufficient to yield a pH of the aqueous overcolor coloring composition of about 10 or greater, and a compatible surfactant in an amount sufficient to increase the capillary flow of the aqueous overcolor coloring composition.

The base is included in the aqueous overcolor coloring composition to elevate the pH of the aqueous overcolor coloring composition to a level of about 10 or greater, and preferably from about 10 to about 12. In a preferred embodiment, the aqueous overcolor coloring composition comprises both a reducing agent and a base in an amount sufficient to elevate the pH of the aqueous overcolor coloring composition to about 10 or greater and preferably from about 10 to about 12.

Appropriate undercolor dyes are generally selected to be used in conjunction with the selection of appropriate overcolor dyes. Where an undercolor dye is incapable of maintaining its characteristic color when exposed to a pH of about 10 or greater, an overcolor dye is selected which is capable of maintaining its characteristic color at such a pH, and a base is added to the overcolor coloring composition to yield a pH of about 10 or greater. Where an undercolor dye is incapable of maintaining its characteristic color when exposed to a reducing agent, an overcolor dye is selected which is capable of maintaining its characteristic color in the presence of a reducing agent and a reducing agent is added to the overcolor coloring composition.

Certain undercolor dyes may be selected which are incapable of maintaining their characteristic color when exposed to a combination of a pH of about 10 or greater and a reducing agent. In such a case, an overcolor dye is selected which is capable of maintaining its characteristic color in the presence of a pH of about 10 or greater and a reducing agent and both a base and a reducing agent are added to the overcolor coloring composition.

Most suitable for use as dyes in the undercolor coloring compositions are dyes that are easily destroyed by reducing agent. Such coloring compositions are commonly known in the field and are occasionally used as chemically "erasable" inks. Also suitable for use as dyes in the undercolor coloring compositions are dyes which are easily destroyed in the presence of a pH of about 10 or greater. Dyes must also be compatible with the surfactant employed in the undercolor and overcolor coloring compositions. Especially suitable for use as dyes in the undercolor coloring compositions of the invention are triphenylmethane dyes and azo dyes which are unstable in the presence of a reducing agent and/or a pH of about 10 or greater. Other suitable dyes for use in the undercolor coloring composition of the present invention are polymethine dyes, cyanine dyes and methine dyes. Such dyes include the dyes marketed under the tradenames BASACRYL X-RL YELLOW™ (Basic Yellow 49), marketed by the BASF Corporation, ASTRAZON BLUE FRR™ (Basic Blue 69), ASTRAZON BRILLIANT RED 4G™ (Basic Red 14), and ASTRAZON PINK FBB™ (Basic Red 49) by Miles (Mobay); and the dyes marketed under the tradenames Acid Green 3 by International Dyestuffs Corporation, Acid Blue 93 and Acid Violet 19 marketed by Spectra Color Corporation as well as mixtures thereof. Preferred dyes for use in the undercolor coloring composition of the present invention are Basic Red 14, Acid Green 3, Acid Violet 19, Acid Blue 93, and mixtures thereof.

The listed ASTRAZON dyes are classified as polymethine dyes. Polymethine dyes are colored substances in which a series of —CH= (methine) groups connect to terminal groups of a chromophore. Polymethine and cyanine are often used interchangeably as generic terms for all polymethine dyes. The previous primary usage for polymethine dyes are dying acetate rayon as well as polyacrylnitrile and polyacrylamide. Acid Green 3, Acid Blue 93 and Acid Violet 19 are triphenylmethane dyes. Acid Green 3 is commonly used in making pulp colors or lakes. Acid Violet dyes are primarily fashion colors.

To achieve good coloring of the undercolor coloring composition, the minimum concentration of dye which will produce a workable ink is governed by the color intensity desired, though as little as 0.05% by weight of dye may be sufficient for certain applications. The maximum workable concentration of dye is determined largely by the ability to maintain a stable composition and the depth of color desired, and can vary widely depending upon the concentration of other components. It is also a function of the characteristics of the desired end product. In this case, the desired undercolor coloring composition is suitable for use as a highlighter and should preferably leave the highlighted indicia easily visible (i.e., legible), either when used alone, or when used in combination with an overcolor coloring composition. Optimally, the depth of color of the desired end product should be such that xeroxed copies made of the highlighted material should preferably leave the highlighted indicia easily visible. A practical upper limit in the formulation of, for example, a marker ink comprised of the undercolor coloring composition, is about 15% by weight of dye. The preferred concentration range for most applications is from about 0.05% to about 5% by weight of dye, preferably from about 0.05% to about 1% dye, and even more preferably from about 0.1% to about 0.5% dye.

A surfactant is also included in the undercolor coloring compositions of the multiple coloring composition system. Examples of suitable surfactants include anionic surfactants such as disulfonated surfactants. The disulfonated surfactant manufactured by Dow Chemical Co. and sold under the trademark Dowfax 8390 is preferred for use in the undercolor coloring compositions of the present invention.

The surfactant is preferably included in the undercolor coloring composition such that the undercolor coloring composition comprises from about 10% to about 60%, preferably from about 20% to about 40%, and even more preferably from about 25% to about 35% by weight of surfactant. This relatively high amount of surfactant increases the stability of the coloring composition, by helping to maintain the color of the composition. In the context of the present invention, any compatible surfactant which increases the stability of the coloring composition by helping to maintain the color of the composition is suitable provided such surfactant does not negate the read-through capability of the resultant undercolor coloring composition. For example, DOWFAX 3B2 may be used.

The undercolor coloring compositions of the present invention are preferably formulated using an acid such as citric acid, or other antioxidant. Inclusion of an acid such as citric acid, or another antioxidant in the undercolor coloring composition such that the acid or other antioxidant is present at levels from about 0.1% to about 3.0% by weight of the undercolor coloring composition maintains a low pH of the composition (i.e., from about 3 to about 6) and, in combination with a surfactant, increases the resistance to fading of a mark produced by the undercolor coloring compositions of the present invention on different types of paper, and in particular, on copy paper such as is routinely used in copier machines, and on coated paper having a "waxy-appearing" surface. Acids and other antioxidants other than citric acid can also be employed in the context of the present invention. Generally the antioxidant is employed in an effective amount sufficient to maintain the pH of the undercolor coloring composition at about 3 to about 6. Thus, generally, for instance, when citric acid is used, it is present in an amount from about 0.1% to about 3.0% by weight of the undercolor coloring composition. Preferably the acid such as the citric acid or other antioxidant is contained in the undercolor coloring composition in an amount of from about 0.1 to about 1.0%, and more preferably from about 0.4 to about 0.8% by weight.

The water used in the undercolor coloring compositions of the present invention is preferably deionized water. The amount of water present in the undercolor coloring compositions is typically from about 10% to about 90% by weight, and this amount is in large part determined by the desired end use of the undercolor coloring composition, for instance, as an ink, and the amount of other components included in the undercolor color composition. To achieve a desirable viscosity when the undercolor coloring composition is used in the form of, for example, an ink, water is preferably present in the undercolor coloring composition in an amount of from about 20% to about 80%, and most preferably from about 45% to about 60% by weight.

Accordingly, the present invention provides an undercolor coloring composition comprising (a) an effective amount of an acid sufficient to maintain the pH of the undercolor coloring composition at from about 3 to about 6; (b) from about 0.05% to about 1% by weight of an undercolor dye; and (c) from about 10% to about 60% by weight of a surfactant.

The present invention also provides overcolor coloring compositions. The overcolor coloring compositions of the present invention are preferably formulated by combining a surfactant, a reducing agent, and a base with an overcolor dye which maintains its characteristic color in the presence of reducing agent and in high pH conditions. Preferably, the overcolor dye should maintain its characteristic color in the presence of an acid such as citric acid in an amount from about 0.1% to about 3.0% by weight, which may be included in the undercolor coloring composition. Of course, where dyes used in the undercolor composition are only affected by a reducing agent, the base may be deleted. Also, where dyes used in the undercolor composition are only affected by an elevated pH, the reducing agent may be eliminated. However, for maximum commercial application and for maximum effect upon a wider variety of undercolor compositions, the overcolor composition is preferably formulated with a reducing agent and base in combination. The dye must also be compatible with the surfactant employed in the undercolor coloring composition and the overcolor coloring composition.

A limited number of dyes meet this criteria. Dyes to be used in the overcolor coloring composition must be highly resistant to chemical attack such as from a reducing agent or high pH conditions. Overcolor dyes meeting this criteria include xanthene dyes, pthalocyanine dyes, and azo dyes which are stable in the presence of a pH of about 10 or greater and/or are stable in the presence of a reducing agent and in the presence of an acid such as citric acid in an amount from about 0.1% to about 3.0% by weight.

One overcolor dye which has been found to meet these criteria is PYRANINE 120™, a trademark for C.I. Solvent Green 7 marketed by Miles (Mobay). Accordingly, a preferred overcolor dye for use in the overcolor coloring composition of the present invention is Pyranine 120. Other dyes which also meet these criteria include Acid Red 52 marketed by Carolina Color, Food Red 14 marketed by Hilton-Davis, BASANTOL GREEN 910™ marketed by BASF, Acid Red 87 marketed by Hilton-Davis, Acid Red 92 marketed by International Dyestuffs Corporation, Acid Red 388 and Direct Blue 199 marketed by Crompton & Knowles, and mixtures thereof.

Acid Red dyes, classified as xanthene dyes, are generally used as colorants for foods, drugs and cosmetics. Specifically, Acid Red 87, is the disodium salt of 2,4,5,7-tetrabromo- 9-o-carboxyphenyl-6-hydroxy-3-isoxanthone. Acid Red 87 is also called D & C Red No. 22 by the Food and Drug Administration ("FDA"), and sold under the tradenames Eosine YS and Eosine G. In addition, Acid Red 92, the disodium salt of 2,4,5,7-tetrabromo-9-3,4,5,6 tetrachloro-o-carboxylphenyl- 6-hydroxy-3-isoxanthone, is called D & C Red No. 28 by the FDA, and sold under the tradename Phloxine B. Acid Red 52 is a colorant for plastics. Further, Food Red 14 or FD&C Red No. 3, commercially available under the tradenames Erythrosine and Erythrosine Bluish, is the disodium salt of 9(o-carboxyphenyl)-6-hydroxy-2,4,5,7-tetraiodo- 3H-xanthen-3-one, which contains smaller amounts of lower iodinated fluoresceins.

To achieve good coloring of the overcolor coloring composition, the minimum concentration of dye which will produce a workable ink is governed by the color intensity desired, though as little as 0.05% by weight of dye may be sufficient for certain applications. The maximum workable concentration of dye is determined largely by the ability to maintain a stable composition and the depth of color desired, and can vary widely depending upon the concentration of other components. It is also a function of the characteristics of the desired end product. In this case, the desired end product should preferably be capable, on making a mark through text leaving the highlighted indicia easily visible (i.e., legible), either when used alone, or when used in combination with the undercolor coloring composition. Optimally, the depth of color of the desired end product should be such that xeroxed copies made of the highlighted material should preferably leave the highlighted indicia easily visible. A practical upper limit in the formulation of, for example, a marker ink comprised of the overcolor coloring composition, is about 15% by weight. The preferred concentration range for most applications is from about 0.05% to about 10% by weight of dye, preferably from about 1% to about 5% dye, and even more preferably from about 1% to about 3% dye.

A surfactant is also included in the overcolor coloring compositions of the multiple coloring composition system.

Examples of suitable surfactants include anionic surfactants such as disulfonated surfactant. The disulfonated surfactant manufactured by Dow Chemical Co. and sold under the trademark Dowfax 3B2 is preferred for use in the overcolor coloring compositions of the present invention. Other suitable surfactants include Dowfax 8390 and Polyterge 382, available from Olin Chemical Co.

The surfactant is preferably included in the overcolor coloring composition such that the overcolor coloring composition comprises from about 0.5% to about 20%, preferably from about 1.0% to about 5.0%, and even more preferably from about 2.5% to about 3.5% by weight of surfactant. This relatively low amount of surfactant increases flow rate and cap off of the compositions, and for instance, aids in capillary flow of the composition through the nib of a writing or marking instrument when the compositions are used in the form of an ink. In the context of the present invention, any compatible surfactant which increases the flow rate and cap off of the compositions is suitable provided such surfactant does not negate the read-through capability of the resultant overcolor coloring composition. Such a surfactant must also be stable in high pH compositions, and in compositions containing reducing agents and bleaches.

Typical reducing agents for use in the overcolor coloring composition of the invention include hydrogen sulfide, sodium sulfite, sodium bisulfite, and stannous chloride. Certain limited bleaches which act as weak oxidizing agents such as sodium hypochlorite and hydrogen peroxide may also operate to effect a color change. Hydrogen peroxide is also known to sometimes operate as a weak reducing agent. The preferred reducing agent for use in the overcolor coloring composition of the invention is $Na_2SO_3$ (sodium sulfite). Reducing agent is generally present in the overcolor coloring composition of the invention in an amount from about 1% to about 20% by weight with a minimal amount required to allow for the elimination of the undercolor coloring composition of the invention and the maximum amount determined by the stability of the composition and the safety of the composition for use by children. Preferably, the reducing agent is contained in the overcolor coloring composition in an amount of from about 5% to about 15%, and most preferably in an amount of from about 8% to about 12% by weight of the overcolor coloring composition.

Overcolor coloring compositions of the invention may be formulated using only a reducing agent. However, the reducing agents used in overcolor coloring compositions of the invention perform most effectively in the presence of an elevated pH. To elevate the pH of the overcolor coloring composition, a base is added. Bases which may be used in the overcolor coloring composition of the invention are typically strong bases, usually having a pH of from about 10 to about 12. Typical bases which may be employed in the overcolor coloring composition of the invention include ammonium hydroxide, sodium hydroxide, and sodium carbonate. The preferred base is sodium hydroxide.

The base is generally present in the overcolor coloring composition of the invention in an amount from about 0.1% to about 20% by weight. Preferably, the base is added in an amount sufficient to raise the pH of the composition to a pH of from about 10 to about 12. Preferably, the base is contained in the overcolor coloring composition in an amount of from about 5% to about 15%, and most preferably from about 10% to about 12% by weight of the overcolor coloring composition.

The water used in the overcolor coloring compositions of the present invention is preferably deionized water. The amount of water present in the overcolor coloring composition is also governed in large part by the desired end use of the composition, for instance, as an ink, and the amount of other components included in the overcolor coloring composition. The amount of water present in the overcolor coloring compositions is typically from about 10% to about 90% by weight. To achieve a desirable viscosity when the overcolor coloring composition is used in the form of, for example, an ink, water is preferably present in an amount of from about 20% to about 80%, and most preferably from about 45% to about 60% by weight.

Accordingly, the present invention provides an overcolor coloring composition comprising (a) from about 0.1% to about 12% by weight of a base; (b) from about 1% to about 20% by weight of a reducing agent; (c) from about 0.05% to about 15% by weight of an overcolor dye which maintains its characteristic color in the presence of a reducing agent and base in an amount from about 10% to about 12% by weight; and from about 0.5% to about 20% by weight of a surfactant.

Optionally, both the undercolor coloring compositions and the overcolor coloring compositions according to the invention may further comprise such additives as humectants, drying agents and preservatives such as biocides and fungicides.

Addition of a humectant ensures that coloring compositions of the invention, when in the form of an ink, do not prematurely dry in a capillary marking system, such as a bonded fiber marking nib. Typical humectants which may be employed in the coloring compositions of the present invention include polyhydric alcohols such as ethylene glycol, propylene glycol, hexylene glycol and poly(ethylene glycol), and hydroxylated starches. The humectant is preferably glycerin.

The humectant is generally used in the composition in an amount of from about 0% to about 30% by weight, though this range is by no means critical. The amount of humectant to be added is determined by the type of nib used in the writing or marking instrument to be employed and the protection time period desired. In one preferred composition, the humectant, glycerin, is added to the coloring composition in an amount of from about 10% to about 20% by weight.

To achieve a more rapid drying rate and to improve marking characteristics upon nonporous materials, a drying agent may be added to increase the overall volatility and therefore the evaporation rate of the water and the pH regulant. Any compatible material which performs this function may be used.

The drying agent preferably should be a volatile polar material so as to ensure compatibility with the primary components of the marker ink. Straight chain C2–C4 alcohols are good, highly volatile drying agents, and of these, ethanol is preferred because of its relatively low cost and because it does not contribute any unpleasant odor to the composition. Alcohols can also provide added benefits, such as reducing surface tension, increasing adherence of the ink to porous surfaces, and providing bactericidal activity when added to the ink composition.

To discourage improper usage of the marker ink, such as ingesting the ink, the alcohol may contain a bittering agent or a conventional denaturant. An alcohol utilizing a bittering agent will discourage such improper usage of the ink by simply imparting a disagreeable taste, while not requiring the use of toxic denaturants as methanol or benzene, and is therefore preferred. A conventional denatured alcohol may, of course, also be utilized. The most preferred drying agent is an ethyl alcohol which contains a bittering agent and which is sold under the trade name SDA 40B, manufactured by Aaper Alcohol.

When utilized, the drying agent preferably is added from about 5% up to about 30% by weight, with the most preferred concentration being about 8–10% by weight, though these amounts are not critical to the practice of the invention. About 8% per weight of drying agent is ordinarily required to ensure rapid drying of the ink on a nonporous surface, while amounts in excess of about 30% by weight may adversely affect stability of the ink unless other stabilizing additives are employed.

To maintain the shelf life of the composition, a preservative may be added. The preservative preferably serves as both a bactericide and a fungicide, and is added in any effective amount, though a typical concentration range is from about 0.1% up to about 5.0% by weight. The use of preservatives in levels greater than about 5% by weight may cause the ink to become toxic or unstable and may, in any event, be unnecessary. Should alcohol be added to the composition as a drying agent, that alcohol will function as a preservative to some extent also.

Any conventional preservative may be utilized in the invention as long as there is compatibility with the remaining ink components. For example, preservatives manufactured by Dow Chemical Co. and sold under the trademarks Dowicil 75 (1-(3-chloroallyl)-3,5,7-triaza-1-azoniaadamantane chloride) and Dowicil 200 (3-chlorovinylhexamethylene tetrammonium chloride) or a preservative manufactured by Rohm and Haas and sold under the trademark Kathon PFM (isothiazolinones), or a preservative manufactured by Sutton Labs and sold under the trademark Germall II (imazolidinyl urea), or a preservative manufactured by Merck and sold under the trademark Tektamer 38 (1,2 dibromo-2, 4-dicyanobutane), will work in the composition of the invention.

Other acceptable preservatives include TROYSAN POLYPHASE P100™, a 3-Iodo-2-Propynyl Butyl Carbamate sold by Troy Chemical, PVP K-30™, solubilized in a 2-Pyrrolidinone, 1-Ethenyl-, Homopolymer solubilizer $((C_6MgNO)_x$ sold by ISP Technologies Inc., and M-PYROL™ a 1-Methyl-Pyrrolidinone solubilizer sold by GAF Chemicals Corporation. Addition of preservatives to the undercolor and overcolor coloring compositions inhibits the growth of bacteria and fungi in water-based products.

Typically, a consumer may make marks or color a picture using one or more markers containing various undercolor coloring compositions on a suitable substrate, such as paper. The consumer may then select one or more markers containing various overcolor coloring compositions of the invention. The consumer may then overwrite a portion or all of the previously made markings, eliminating the color of the undercolor coloring composition as applied, and leaving only the color of the overcolor coloring composition used to overwrite the undercolor coloring composition. Because of the surprisingly strong and immediate impact of the overcolor coloring composition used to overwrite the undercolor coloring composition, the overcolor marker appears to paint a color over the undercolor on the portions of the substrate on which it is applied.

A consumer may also apply the overcolor coloring composition directly to the substrate. If an undercolor coloring composition is then used to overwrite the mark laid down by the overcolor coloring composition, the overcolor coloring composition will eliminate the color contributed by the undercolor coloring composition leaving only the color of the overcolor coloring composition where that mark was previously made. The undercolor color will be seen on other locations on the substrate. This change has been observed to occur more slowly than when the overcolor coloring composition is applied over the undercolor coloring composition. This slowed reaction is presumably caused by the penetration of the overcolor coloring composition into the paper substrate. A child consumer gains great play benefit by viewing this slowly disappearing color.

Preferably, when the coloring compositions of the invention are used in the form of inks, the inks are placed in conventional markers. Various undercolor coloring compositions are placed in an undercolor set of markers, each containing an appropriate different color dye. Various overcolor coloring compositions of the invention are placed in a second group of markers, each of these compositions containing an appropriate different color dye. For convenience, it is also possible to construct a marker containing one of a number of undercolor coloring compositions in one half of the marker, and one of a number of overcolor coloring compositions in the other half of the marker, wherein the compositions are separated by a dam within the marker, such that no intermixing of the compositions can occur.

Preferably, the markers of the present invention utilize reservoirs for storing the ink and nibs such as bonded fiber or sintered plastic to dispense the ink. Typically, an ink reservoir contains a sponge-like reservoir which holds the ink. The preferred reservoirs for the undercolor coloring compositions of the invention are made of acetate, polyester or polypropylene. The preferred reservoirs for the overcolor coloring compositions of the invention are made of polypropylene, which more suitably resists attack by any reducing agent contained in the overcolor coloring composition, and is more resistant to high pH conditions.

In general, any suitable nib may be used in conjunction with the undercolor coloring compositions of the invention. However, where nylon or polyamide fibers are used, they should be checked for preferential dye absorption. Also, any compatible nib may be used in conjunction with the overcolor coloring compositions of the invention. Sintered polyethylene nibs are preferred, and nylon and polyamide nibs should be checked for preferential dye absorption. In general, bonded polyester fiber nibs are not suitable for use with the overcolor coloring compositions of the invention.

A marking kit or system is also formed which comprises both overcolor coloring compositions and undercolor coloring compositions. The present invention provides a color changing marking system comprising one or more undercolor marking instruments and one or more overcolor marking instruments. Preferably the undercolor marking instruments contain an undercolor coloring composition comprising: (a) an effective amount of an acid sufficient to maintain the pH of the undercolor coloring composition at from about 3 to about 6; (b) from about 0.05% to about 15% by weight of an undercolor dye; and (c) from about 20% to about 60% by weight of a surfactant. Preferably the overcolor marking instruments contain an overcolor coloring composition comprising: (a) from about 0.1% to about 12% by weight of a base; (b) from about 1% to about 20% by weight of a reducing agent; (c) from about 0.05% to about 15% by weight of an overcolor dye which maintains its characteristic color in the presence of a reducing agent and base in an amount from about 10% to about 12% by weight; and from about 0.5% to about 20% by weight of a surfactant.

The following examples serve to illustrate further the present invention and are not to be construed as in any way limiting its scope.

EXAMPLES

Examples of marking systems of the present invention formulated as an ink are as follows. Quantities presented are in percent by weight of the total composition.

Undercolor Color Ink Examples

| Component | Example 1 Pink Ink % | Example 2 Green Ink % |
|---|---|---|
| Deionized Water | 51.5 | 51.4 |
| Glycerin | 15.0 | 15.0 |
| Preservatives | | |
| Nuosept 95 Premix | 0.3 | 0.3 |
| Troysan Polyphase | | |
| P-100 | 0.05 | 0.05 |
| PVP-K30 | 0.05 | 0.05 |
| M-Pyrol | 2.4 | 2.4 |
| Dowfax 8390 | 30.0 | 30.0 |
| Citric Acid | 0.5 | 0.5 |
| Dye | | |
| Acid Green 3 | — | 0.3 |
| Basic Red 14 | 0.2 | — |

| Component | Example 3 Blue Ink % | Example 4 Purple Ink % |
|---|---|---|
| Deionized Water | 51.4 | 51.4 |
| Glycerin | 15.0 | 15.0 |
| Preservatives | | |
| Nuosept 95 Premix | 0.3 | 0.3 |
| Troysan Polyphase | | |
| P-100 | 0.05 | 0.05 |
| PVP-K30 | 0.05 | 0.05 |
| M-Pyrol | 2.4 | 2.4 |
| Dowfax 8390 | 30.0 | 30.0 |
| Citric Acid | 0.5 | 0.5 |
| --Dye | | |
| Acid Blue 93 | 0.3 | — |
| Acid Violet 19 | — | 0.3 |

The inks of Examples 1–4 had acceptable working properties. The pH ranged from 3.0 to 3.5, the specific gravity ranged from 1.07 to 1.08, the viscosity ranged from 3.4 to 3.7 centipoise, and the surface tension ranged from 39 to 41 dynes/cm. The inclusion of the surfactant was found to increase the stability of the inks in terms of helping to maintain the color of the compositions.

Furthermore, the inks of Examples 1–4 demonstrated substantial read-through capability. Indicia highlighted using these inks was easily visible (i.e., legible), and was also easily visible on xeroxed copies made of the highlighted material.

The inclusion of an acid (in this case, citric acid) in the inks of Examples 1–4 was found to increase the resistance to fading of these inks on paper. When citric acid was not included in the inks, the stability of the inks on certain types of paper, and in particular, on copy paper, was found to be reduced. The inclusion of citric acid in the compositions in an amount from at least about 0.1% by weight (resulting in maintenance of a solution pH of about 3–6) was found to increase the resistance of the inks to fading on different types of paper.

The inks of Examples 1–4 are especially suitable for overcolor elimination by an overcolor coloring composition containing a reducing agent. Furthermore, the inks of Examples 1–4 are especially suitable for overcolor elimination by an overcolor coloring composition having a pH of about 10 or greater whether or not a reducing agent is present.

Inks that are especially appropriate for overcolor elimination of the inks of Examples 1 and 2 is presented in Examples 5–7.

Overcolor Coloring Ink Examples

| Component | Example 5 Yellow Ink % |
|---|---|
| Deionized Water | 58.8 |
| Glycerin | 15.0 |
| $Na_2SO_3$ | 10.2 |
| NaOH (5N Soln) 20% Solution | 11.0 |
| Pyranine 120 | 2.0 |
| Dowfax 3B2 | 3.0 |

| | Example 6 Green Ink | Example 7 Pink Ink |
|---|---|---|
| Deionized water | 60.1 | 60.6 |
| Glycerin | 15.0 | 15.0 |
| $Na_2SO_3$ | 10.2 | 10.2 |
| NaOH 5N (20% solution) | 11.0 | 11.0 |
| Dowfax 3B2 | 3.0 | 3.0 |
| Direct Blue 199 | 0.3 | — |
| Pyranine 120 | 0.4 | — |
| Acid Red 388 | — | 0.2 |

The inks of Examples 5–7 had acceptable working properties. The pH of these inks ranged from 11.9 to 12.3, the specific gravity ranged from 1.16 to 1.18, the viscosity ranged from 3.9 to 4.2 centipoise, and the surface tension ranged from 34 to 35 dynes/cm. The inclusion of the surfactant was found to increase the capillary flow of the ink, as evidenced by an increase in the flow rate and cap off.

Furthermore, the inks of Examples 5–7 demonstrated substantial read-through capability. Indicia highlighted using these inks was easily visible (i.e., legible), and was also easily visible on xeroxed copies made of the highlighted material. Read-through capability was retained when the inks of Examples 1 and 2–4 were used in combination with the ink of Examples 5–7.

Moreover, the inks of Examples 5–7 were found to be stable in the presence of an acid such as citric acid. Specifically, the inks of these examples were capable of maintaining their characteristic color in the presence of citric acid in an amount from about 0.1% up to about 3.0% by weight of the overcolor coloring composition. Some bleaching out of the overcolor coloring composition was found to occur when citric acid was included in the composition in an amount from about 3.0% by weight, but not when citric acid was included in the composition in an amount from about 0.5%.

In using the various above described overcolor coloring composition and undercolor coloring compositions, a child could place a mark of the undercolor green or pink coloring composition on paper, perhaps to paint pink flowers in a field of grass. If the child then wishes to add in yellow daisies, the child may easily use the above-indicated overcolor coloring ink composition, without tainting any of the colors. Alternatively, if the child draws yellow daisies using the yellow overcolor coloring composition, he or she may draw in grass or pink flowers using the green and pink undercolor inks right over the yellow without spoiling the colors.

Similarly, the multiple coloring compositions may also be used advantageously by other consumers. For example, students or other types of workers needing differential marking capability may employ the highlighters. Such consumers may highlight clauses of written material of particular relevance. If certain clauses within that clause take on further significance, or if a clause has been mismarked (as will often happen during highlighting), the consumer may use the overwriter in addition to the underwriter to change the appearance of the highlighting. This will make the person's task much easier, and will prevent additional highlighted copies from having to be made in the event of a highlighting error. Furthermore, the read-through capability of the overcolor and undercolor coloring compositions will optimally allow the highlighted material to easily be read through the highlighter, and will allow xeroxed copies of the highlighted material to be made such that the previously highlighted material can easily be read on the xeroxed copy.

From the foregoing description and examples, it is apparent that the objects of the present invention have been achieved. While only certain embodiments have been set forth, alternative embodiments and various modifications will be apparent to those skilled in the art. These and other alternatives are considered equivalents and within the spirit and scope of the present invention. All of the references and previous applications cited herein are hereby incorporated in their entireties by reference.

What is claimed is:

1. A multiple coloring composition system comprising:
   (a) an aqueous undercolor coloring composition comprising a undercolor dye whose coloring ability is destroyed in the presence of a pH of about 10 or greater, in the presence of a reducing agent, or a combination thereof, and a compatible surfactant in an amount sufficient to increase the stability of said coloring composition; and
   (b) an aqueous overcolor coloring composition comprising an overcolor dye capable of maintaining its characteristic color in the presence of a pH of about 10 or greater, an effective amount of base sufficient to yield a pH of the aqueous overcolor coloring composition of about 10 or greater, and a compatible surfactant in an amount sufficient to increase the capillary flow of said aqueous overcolor coloring composition.

2. The multiple coloring composition system of claim 1, wherein said undercolor coloring composition comprises a surfactant in an amount from about 10% to about 60% by weight, and wherein said overcolor coloring composition comprises a surfactant in an amount from about 0.5% to about 20% by weight.

3. The multiple coloring composition system of claim 1, wherein said effective amount of said base comprises an amount sufficient to yield a pH of said aqueous overcolor coloring composition of from about 10 to about 12.

4. The multiple coloring composition system of claim 1, wherein said effective amount of said base comprises an amount from about 10% to about 12% by weight of said aqueous overcolor coloring composition.

5. The multiple composition system of claim 1, wherein said undercolor dye of said undercolor coloring composition is selected from the group consisting of triphenylmethane dyes and azo dyes.

6. The multiple coloring composition system of claim 1, wherein said undercolor dye of said undercolor coloring composition is selected from the group consisting of Basic Red 14, Acid Green 3, Acid Blue 93, Acid Violet 19, and mixtures thereof.

7. The multiple coloring composition system of claim 1, wherein said overcolor dye of said overcolor coloring composition is selected from the group consisting of xanthene dyes, pthalocyanine dyes, and azo dyes.

8. The multiple coloring composition system of claim 1, wherein said overcolor dye of said overcolor coloring composition is C.I. Solvent Green 7.

9. The multiple coloring composition system of claim 1, wherein said overcolor coloring composition further comprises a reducing agent.

10. The multiple coloring composition system of claim 9, wherein said reducing agent is selected from the group consisting of hydrogen sulfide, sodium sulfite, sodium hypochlorite and hydrogen peroxide.

11. The multiple coloring composition system of claim 9, wherein said reducing agent is present in an amount from about 1% to about 20% by weight.

12. The multiple coloring composition system of claim 1, wherein said base is selected from the group consisting of ammonium hydroxide, sodium hydroxide and sodium carbonate.

13. The multiple coloring composition system of claim 1, wherein said undercolor and said overcolor coloring compositions further comprise a humectant in an amount of from about 0% to about 30% by weight.

14. The multiple coloring composition system of claim 1, wherein said undercolor and said overcolor coloring compositions further comprise a drying agent in an amount of from about 5% to about 30% by weight.

15. The multiple coloring composition system of claim 1, wherein said undercolor and said overcolor coloring compositions further comprise a preservative.

16. The multiple coloring composition system of claim 1, wherein said undercolor coloring composition further comprises an effective amount of an acid sufficient to maintain the pH of said undercolor coloring composition at from about 3 to about 6.

17. The multiple coloring composition system of claim 16, wherein said acid is citric acid which is present in an amount from about 0.1% to about 3.0% by weight of said undercolor coloring composition.

18. The multiple coloring composition system of claim 1, wherein said undercolor dye is present in an amount of from about 0.05% to about 15% by weight.

19. The multiple coloring composition system of claim 1, wherein said undercolor dye is present in an amount of from about 0.1% to about 0.5% by weight.

20. The multiple coloring composition system of claim 1, wherein said overcolor dye is present in an amount of from about 0.05% to about 15% by weight.

21. The multiple coloring composition system of claim 1, wherein said overcolor dye is present in an amount of from about 1% to about 3% by weight.

22. An overcolor coloring composition comprising (a) from about 0.1% to about 12% by weight of a base; (b) from about 1% to about 20% by weight of a reducing agent; (c) from about 0.05% to about 15% by weight of an overcolor dye which maintains its characteristic color in the presence of said reducing agent and said base; and from about 0.5% to about 20% by weight of a surfactant.

23. An undercolor coloring composition comprising (a) an effective amount of an acid sufficient to maintain the pH of said undercolor coloring composition at from about 3 to about 6; (b) from about 0.05% to about 1% by weight of an undercolor dye; and (c) from about 20% to about 60% by weight of a surfactant.

24. A color changing marking system comprising at least an undercolor marking instrument and an overcolor marking instrument, said undercolor marking instrument containing an undercolor coloring composition comprising (a) an effective amount of an acid sufficient to maintain a pH of said undercolor coloring composition at from about 3 to about 6; (b) from about 0.05% to about 15% by weight of an undercolor dye; and (c) from about 20% to about 60% of a surfactant, and said overcolor marking instrument containing an overcolor coloring composition comprising (a) from about 0.1% to about 12% by weight of a base; (b) from about 1% to about 20% by weight of a reducing agent; (c) from about 0.05% to about 15% by weight of an overcolor dye which maintains its characteristic color in the presence of a reducing agent and base in an amount from about 10% to about 12% by weight; and from about 0.5% to about 20% by weight of a surfactant, said undercolor coloring composition losing its color upon contact with said overcolor coloring composition.

25. The marking system of claim 24, wherein said reducing agent is sodium sulfite.

26. The marking system of claim 24, wherein said base is sodium hydroxide.

27. The marking system of claim 24, wherein said marker comprises an ink reservoir coupled to a nib.

28. A multiple coloring composition system comprising:

(a) an aqueous undercolor coloring composition comprising an undercolor dye whose coloring ability is destroyed in the presence in the presence of a pH of about 10 or greater and/or a reducing agent, and a compatible surfactant in an amount sufficient to increase the stability of said coloring composition; and (b) an aqueous overcolor coloring composition comprising an overcolor dye capable of maintaining its characteristic color in the presence of a reducing agent, an effective amount of a reducing agent sufficient to destroy the coloring ability of said undercolor dye, and a compatible surfactant in an amount sufficient to increase the capillary flow of said aqueous overcolor coloring composition.

\* \* \* \* \*